(12) United States Patent
Hrabosky

(10) Patent No.: US 9,367,226 B2
(45) Date of Patent: Jun. 14, 2016

(54) TECHNIQUES FOR SELF ADJUSTING KIOSK DISPLAY INFORMATION

(75) Inventor: Vincent J. Hrabosky, Buford, GA (US)

(73) Assignee: NCR Corporation, Duluth, GA (US)

( * ) Notice: Subject to any disclaimer, the term of this patent is extended or adjusted under 35 U.S.C. 154(b) by 95 days.

(21) Appl. No.: 12/800,868

(22) Filed: May 25, 2010

(65) Prior Publication Data

US 2011/0296355 A1 Dec. 1, 2011

(51) Int. Cl.
*G06F 3/0488* (2013.01)
*G06Q 30/02* (2012.01)

(52) U.S. Cl.
CPC .......... *G06F 3/0488* (2013.01); *G06Q 30/0281* (2013.01)

(58) Field of Classification Search
CPC .......... G06Q 30/0281; G06Q 30/0237; G06Q 30/0601; G06Q 20/1085; G06Q 20/18; G06F 3/0488
USPC .......................................................... 902/30
See application file for complete search history.

(56) References Cited

U.S. PATENT DOCUMENTS

| | | | |
|---|---|---|---|
| 6,061,048 A * | 5/2000 | Choi | 715/785 |
| 6,803,906 B1 * | 10/2004 | Morrison et al. | 345/173 |
| 6,996,460 B1 | 2/2006 | Krahnstoever et al. | |
| 2002/0156682 A1 * | 10/2002 | DiPietro | 705/16 |
| 2007/0164554 A1 * | 7/2007 | Krone et al. | 283/56 |
| 2007/0265935 A1 * | 11/2007 | Woycik et al. | 705/26 |
| 2008/0172243 A1 * | 7/2008 | Kelly | 705/1 |
| 2008/0231604 A1 | 9/2008 | Peterson | |
| 2009/0313125 A1 | 12/2009 | Roh et al. | |
| 2011/0199335 A1 * | 8/2011 | Li et al. | 345/175 |

OTHER PUBLICATIONS

"Delta Kiosk Style Guide", Aug. 2009, Delta, pp. 1-15.*
"Drive-Thru Kiosks", Feb. 2010, Nextep Systems.*
"Nextep Systems and MRI Unveil the Drive-Thru Kiosk of the Future", Manufacturing Resources International, Nov. 2009, XP002736647, Retrieved from the Internet: URL:http://www.mri-inc.net/images-pdf-news/MRI-NexTepDrive-ThruPressRelease111309.pdf [retrieved on Mar. 2, 2015] p. 2, line 9-line 11 & WO 2010/085/085784 A2 (MFG Resources Int Inc [US]; Dunn William [US] Jul. 29, 2010 Not a P,X as EP application withdrawn

* cited by examiner

*Primary Examiner* — Namitha Pillai
(74) *Attorney, Agent, or Firm* — Schwegman, Lundberg & Woessner

(57) ABSTRACT

Techniques for self adjusting kiosk display information are provided. Presentation information is centered within a display of the kiosk. A center location for the presentation information is custom recalibrated within the display based on direction of a user. The layout, content, and presentation within the display of the kiosk is user-driven and customizable.

13 Claims, 4 Drawing Sheets

TECHNIQUES FOR SELF ADJUSTING KIOSK DISPLAY INFORMATION

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, grocery stores, department stores, and others.

Kiosks are often equipped in as a "one size fits all" approach. That is, the kiosks are not flexible and are not adaptable to accommodate the customers that are using the kiosks. So, shorter customers may encounter problems with a stationary kiosk because it is too high for them to access properly. In another situation, customers in large Sport Utility Vehicles (SUV's) that drive through a kiosk may have to exit their car to properly access the kiosk.

In short, Kiosks are rigid and not customized to the needs of the customers that come to the kiosks in all shapes, sizes, and/or a variety of transportation vehicles.

SUMMARY

In various embodiments, techniques for self adjusting kiosk display information are presented. According to an embodiment, a method for self adjusting kiosk display information is provided. An entry presentation is centered within a display of a kiosk. Next, a touch from a user is detected at a specific location on the display. Finally, the entry presentation is repositioned to be centered at the specific location within the display.

DETAILED DESCRIPTION

Figure 1:
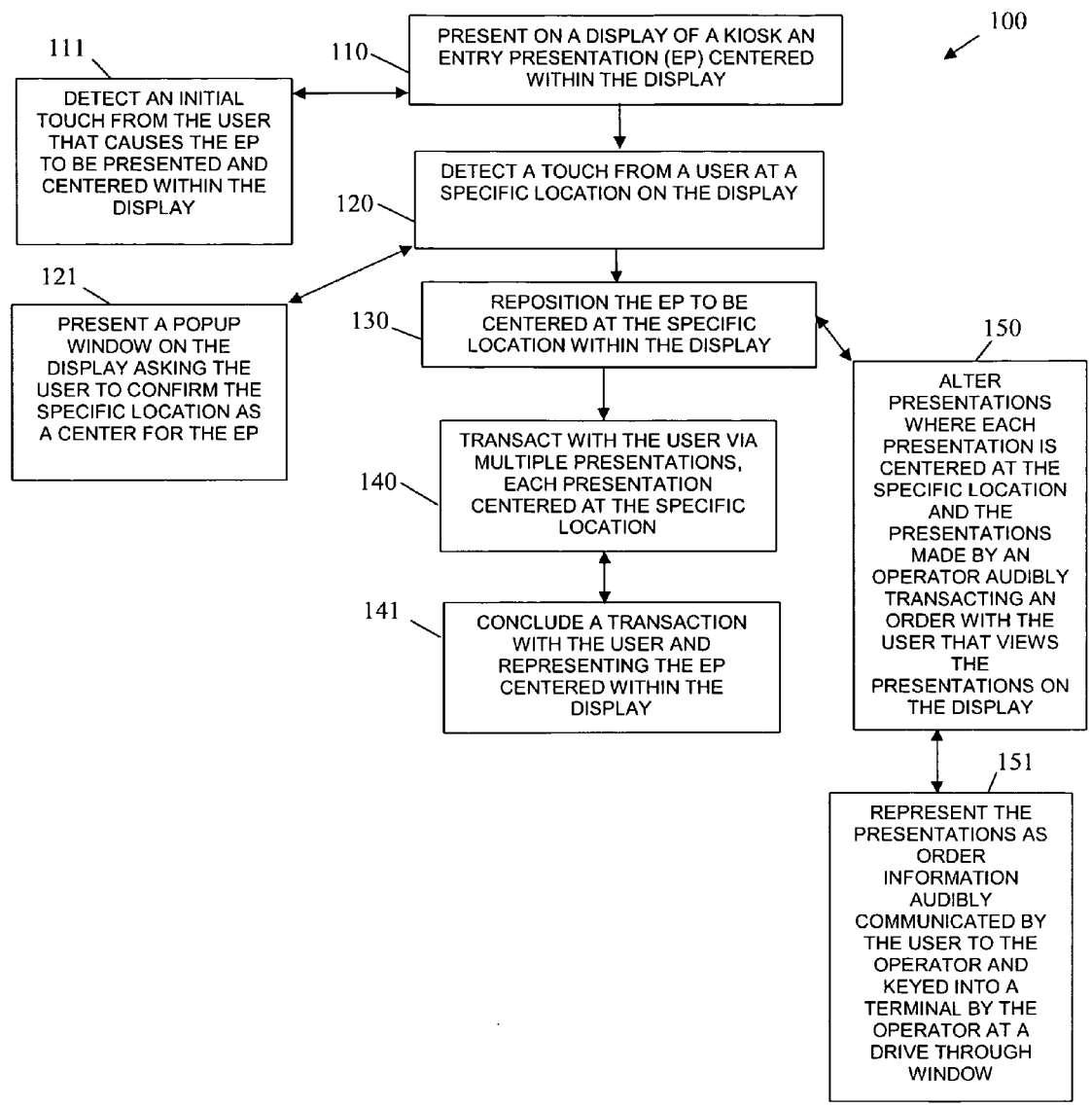
FIG. 1 is a diagram of a method for self adjusting kiosk display information, according to an example embodiment.

FIG. 1 is a diagram of a method 100 for self adjusting kiosk display information, according to an example embodiment. The method 100 (hereinafter "kiosk display service") is implemented as instructions residing on a non-transitory computer-readable storage medium and executed by one or more processors. The processors are specifically configured to process the kiosk display service. In an embodiment, the kiosk display service operates over a network. The network is wireless, wired, or a combination of wired and wireless.

In an embodiment, the kiosk display service executes on processors embedded within a kiosk. The kiosk can be part of a system, such as a drive through window at a fast food establishment, a bank, a pharmacy, and the like; or, the kiosk can be a stand alone machine designed to complete a transaction for any good or service offered by an establishment.

At 110, the kiosk display service presents on a display of a kiosk an entry presentation centered within the display. That is, the initial greeting screen or information presented to a customer in front of the kiosk is centered based on a location that is centered with the four edges of the physical display screen.

According to an embodiment, at 111, the kiosk display service detects an initial touch from the user that causes the entry presentation to be presented and centered within the display based on the four edges of the display screen. In this case, the screen may be initially blank or have some type of advertisement on it unrelated to the function of the kiosk and it is awaiting a customer for transacting business. When the customer initially touches the screen at any location or touches any of the input keys or even swipes a card, the entry presentation is immediately presented and centered within the display based on the four edges of the display screen.

At 120, the kiosk display service detects a touch from a user at a specific location on the display. This can be achieved in a few manners. In one case, the display screen is touch sensitive such that the specific location is immediately identified by coordinate points identifying all points on the display screen and when touched the user identifies a specific point or location within a grid being maintained by the kiosk display service. In another case, a hidden camera may be affixed above the screen or on the side of the screen that captures an image of where the user is touching the screen and the converts that image, via image processing, into the specific location. In this latter situation, the screen does not have to be touch-enabled display screen although to the user (customer) the screen appears to function as a touch-sensitive and enabled display screen.

In an embodiment, at 121, the kiosk display service presents a popup window on the display asking the user (can be referred to herein as a customer as well) to confirm the specific location as a new center for the entry presentation of the kiosk display. This may be useful when the customer inadvertently touches the screen and is not intending to recalibrate the information presented on the display screen.

At 130, the kiosk display service automatically and dynamically in real time repositions the entry presentation centered at or about the specific location (which was detected at 120) within the display. The specific location is different from the center used at 110 (the center based on the four physical edges of the kiosk display). In this manner, the kiosk display is self-adjusting based on user or customer provided direction. This permits the customer based on their situation (car, size, etc.) to decide where information on the display screen of the kiosk is to be provided.

In one scenario, at 140, the kiosk display service transacts with the user, via multiple presentations, each presentation centered at the specific location. So, as information on the display changes the center of the information presented on the display remains the specific location identified by the customer.

Continuing with the embodiment of 140 and at 141, the kiosk display service concludes a transaction with the user and then immediately represents the entry presentation centered within the display at a center identified by the four sides of the display. In other words, the entry presentation is recalibrated back to its original state as soon as the session or transaction with the customer concludes at the kiosk.

In another scenario, at 150, the kiosk display service alters presentations, such that each presentation is centered at the specific location. This was mentioned above but here an operator audibly transacts an order with the user that is viewing the presentations on the display.

Continuing with the embodiment of 150 and at 151, the kiosk display service represents the presentations as order information that is audibly communicated by the user to the operator and keyed into a terminal by the operator at the drive through window and presented on the display back at the location of the customer.

With the embodiments of 150 and 151, the kiosk is a drive through window system where the customer interacts with an operator that is remotely located from the display being presented to the customer. In these cases, the operator may visually inspect the size of the car used by the customer and provide via the terminal the specific location for recalibrating the entry presentation and other information presented to the customer on the display.

Figure 2:
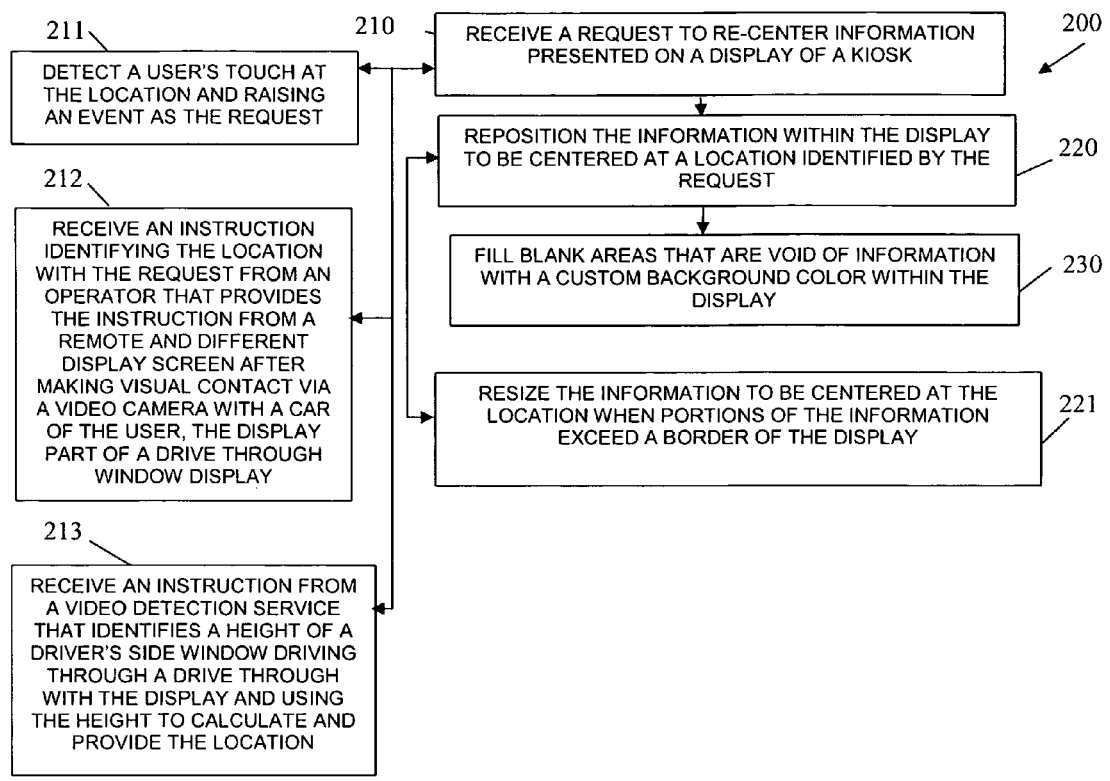
FIG. 2 is a diagram of another method for self adjusting kiosk display information, according to an example embodiment.

FIG. 2 is a diagram of another method 200 for self adjusting kiosk display information, according to an example embodiment. The method 200 (hereinafter "self-adjusting display service") is implemented as instruction within a computer-readable storage medium that execute on one or more processors, the processors specifically configured to execute the self-adjusting display service. In an embodiment, the self-adjusting display service is operational over a network; the network is wired, wireless, or a combination of wired and wireless.

According to an embodiment, the self-adjusting display service is implemented in a stand alone kiosk or a kiosk associated with a drive through service as discussed above with reference to the method 100 of the FIG. 1.

The transaction self-adjusting display service represents another and in some cases enhanced perspective of the kiosk display service, presented above with respect to the discussion of the FIG. 1.

At 210, self-adjusting display service receives a request to re-center or recalibrate information presented on a display of a kiosk.

In an embodiment, at 211, the self-adjusting display service detects a user's touch at the location and then raises an event to produce the request identified at 210. As was mentioned with the discussion of the method 100 of the FIG. 1, the detection can be achieved via a touch-sensitive display screen or can be achieved via a video camera with image processing capabilities. In the latter case, old legacy system displays that are not touch sensitive can be retrofitted to achieve the techniques presented herein with the addition of a camera and image processing.

According to an embodiment, at 212, the self-adjusting display service receives an instruction identifying the location with the request from an operator that provides the instruction from a remote and different display screen after making visual contact via a video camera with a car of the user. Here, the display is part of a kiosk system for a drive through window display. This scenario was discussed above with the embodiments of the FIG. 1 at 150 and 151.

In another situation, at 213, the self-adjusting display service receives an instruction from a video detection service that identifies a height of a driver's side window driving through with the display. Here, the detected height of the window on the driver's side is used to calculate and provide the location. This is another case where sensors can be used to determine a height of the car and an algorithm used to deduce a reduction in height to get to where a drive would be seated at the driver's side window. Calculations are then made to identify the location for recalibrating the display information on the screen of the kiosk.

At 220, the self-adjusting display service repositions the information within the display to be centered at a location identified (or calculated as discussed above) by the request.

In an embodiment, at 221, the self-adjusting display service resizes the information to be centered at the location when portions of the information exceed a boarder of the display. So, when recalibration occurs about the new center at the identified location of the display, the information itself may have to have its font-type and font-size adjusted to ensure it all still is presented in a readable manner to the customer within the display.

According to an embodiment, at 230, the self-adjusting display service auto fills blank areas that are void of information with a custom background color within the display, such as black, red, etc.

Figure 3:
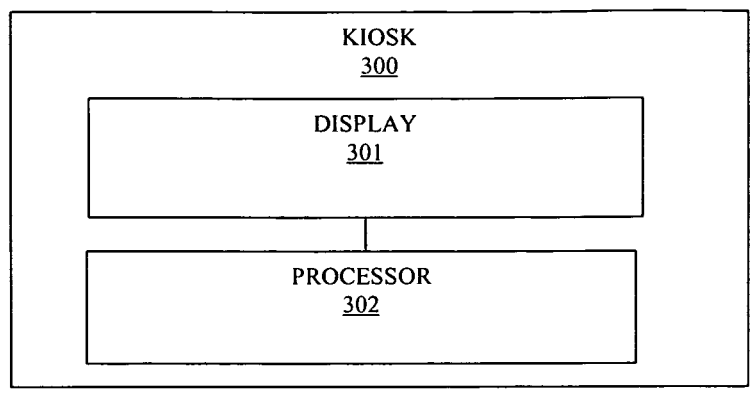
FIG. 3 is a diagram of a kiosk having a self-adjusting display, according to an example embodiment.

FIG. 3 is a diagram of a kiosk 300 having a self-adjusting display, according to an example embodiment. The kiosk 300 includes one or more processors that are specifically configured to perform, inter alia, the processing associated with the methods 100 and 200 of the FIGS. 1 and 2, respectively. The kiosk 300 includes a variety of other hardware components, such as network connections, memory, display screen, input mechanisms, and the like.

The kiosk 300 includes a display 301 and a processor 302. Each of these and their interactions with one another will now be discussed in turn.

The display 301 can be touch enabled (touch screen) or can be a conventional large kiosk display equipped with camera's and image processing capabilities executing on the processor 302 (as discussed above with the methods 100 and 200 of the FIGS. 1 and 2, respectively).

The processor 302 is configured to automatically recalibrate a center point for the presentations within the display 301 based on a direction of a user that interacts with the kiosk 300.

According to an embodiment, the direction provided by the user is a specific location on the display 301 when the display is a touch screen device that is touched by the user at the specific location.

In a different scenario, the direction provided by the user is provided via arrow keys situated on one or more sides of the display 301 and activated by the user and interfaced to be captured and handled by the processor 302.

In yet another situation, the direction provided by the user is achieved audibly via audible commands of the user to move the information on the display 301 to the left, the right, up, and down. Here, the processor 302 is enabled with speech recognition software.

In an embodiment, the kiosk 300 is situated inside a business and is accessed by a user that walks up to the kiosk 300.

In another case, the kiosk 300 is situated at a drive through window system of a business.

Figure 4A:
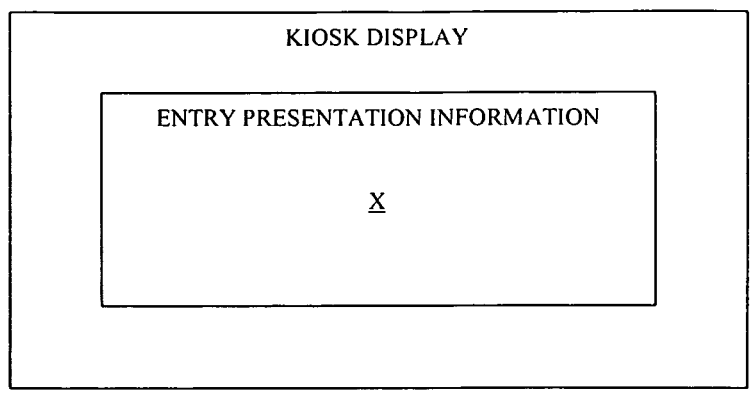
FIGS. 4A and 4B are sample illustrations of a kiosk display before self adjusting and after self adjusting using the techniques presented herein.
Figure 4B:
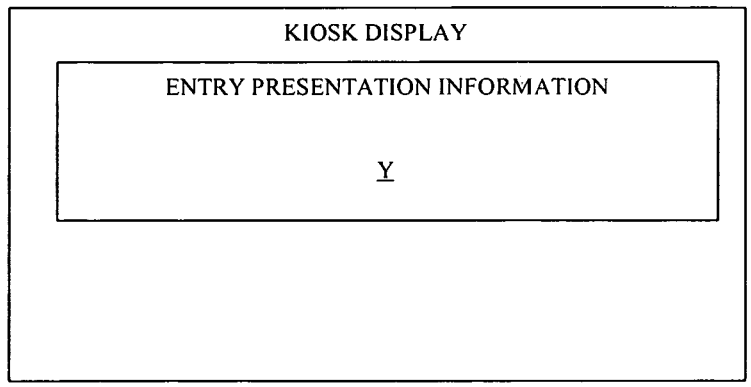

FIGS. 4A and 4B are sample illustrations of a kiosk display before self adjusting and after self adjusting using the techniques presented herein.

The FIG. 4A shows a large display of a kiosk having a block of information or an initial entry presentation that is centered within the display based on the original dimensions of the display itself at location "Y." This is how the display screen with the entry presentation appears to a customer that initially comes up to the kiosk to interact with the kiosk for purposes of conducting a transaction.

The FIG. 4B shows the entry presentation recalibrated and re-centered about a different Center at location "Y." Location Y is defined by the customer that touches the display screen at location Y upon initial interaction with the kiosk. Variations and techniques for achieving this user-driven (or customer-driven) self adjusting display presentation within a kiosk display were presented above with reference to the methods 100 and 200 of the FIGS. 1 and 2, respectively, and with respect to the kiosk 300 of the FIG. 3.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method to execute on a processor configured to execute the method, comprising:
   presenting on a display of a kiosk an entry presentation centered within the display that is an advertisement that is unrelated to a function of the kiosk;
   receiving from an operator at a remote terminal a specific location for the display based on the operator making visual contact with a car of a user situated at the kiosk to determine the specific location; and
   repositioning the entry presentation to be centered at the specific location within the display, the entry presentation repositioned based on four edges of a physical display screen for the display of the kiosk, and processing touches received by the user made on the display with respect to the entry presentation using a hidden camera affixed above the display that captures images of where the user makes the touches and converts the images into locations for the touches within the entry presentation presented on the display.

2. The method of claim 1 further comprising, transacting with the user via multiple presentations, each presentation centered at the specific location.

3. The method of claim 2 further comprising, concluding a transaction with the user and representing the entry presentation centered within the display.

4. The method of claim 1 further comprising, altering presentations where each presentation is centered at the specific location and the presentations made by the operator audibly transacting an order with the user that views the presentations on the display.

5. The method of claim 4, wherein altering further includes representing the presentations as order information audibly communicated by the user to the operator and keyed into a terminal by the operator at a drive through window.

6. The method of claim 1, wherein detecting further includes presenting a popup window on the display asking the user to confirm the specific location as a center for the entry presentation.

7. A processor-implemented method to execute on a processor configured to execute the method, comprising:
   receiving a request to re-center information presented on a display of a kiosk, and wherein an instruction is received with the request that identifies a location with the request from an operator that provides the instruction from a remote display after making visual contact via a video camera with a car of a user positioned in front of the display based on the height of a driver's side window of the car; and
   repositioning the information within the display to be centered at the location identified by the request, the information repositioned based on four edges of a physical display screen for the display of the kiosk and processing touches received by the user made on the display with respect to the information using a hidden camera affixed above the display that captures imam of where the user makes the touches and converts the images into locations for the touches within the information presented on the display.

8. The method of claim 1 further comprising, filling blank areas that are void of information with a custom background color within the display.

9. The method of claim 7, wherein receiving further includes detecting a user's touch at the location and raising an event as the request.

10. The method of claim 7, wherein receiving further includes receiving the instruction where the display is part of a drive through window display.

11. The method of claim 7, wherein repositioning further includes resizing the information to be centered at the location when portions of the information exceed a border of the display.

12. A kiosk, comprising:
   a display; and
   a processor configured to automatically recalibrate a specific location for presentations within the display for a user to interact with the kiosk, and the processor configured to receive the specific location from an operator remote from the display when the operator makes visual contact with a car of the user situated in front of the kiosk, and the specific location different from an initial presentation on the display having a different specific location, the specific location positioned based on four edges of a physical display screen for the display and the specific location identifies a specific location on the physical display, and wherein the processor further configured to processes touches received by the user made on the display with respect to the presentations using a hidden camera affixed above the display that captures images of where the user makes the touches and converts the images into locations for the touches within the presentations presented on the display.

13. The kiosk of claim 12, wherein the kiosk is situated at a drive through window of a business.

* * * * *